(12) United States Patent
Kim et al.

(10) Patent No.: US 7,643,395 B2
(45) Date of Patent: Jan. 5, 2010

(54) DIFFRACTION ELEMENT AND OPTICAL PICK-UP APPARATUS HAVING THE SAME

(75) Inventors: Bong-gi Kim, Suwon-si (KR); Seong-su Park, Suwon-si (KR); Jung-woo Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 11/254,700

(22) Filed: Oct. 21, 2005

(65) Prior Publication Data

US 2006/0158989 A1 Jul. 20, 2006

(30) Foreign Application Priority Data

Jan. 19, 2005 (KR) ........................ 10-2005-0005108

(51) Int. Cl.
*G11B 7/00* (2006.01)

(52) U.S. Cl. .................. 369/112.07; 369/112.03; 369/112.11; 369/112.12

(58) Field of Classification Search ............ 369/112.01, 369/112.03, 112.07, 112.11, 112.12
See application file for complete search history.

(56) References Cited

U.S. PATENT DOCUMENTS

| | | | |
|---|---|---|---|
| 5,128,914 A | 7/1992 | Kurata et al. | |
| 5,617,248 A | 4/1997 | Takahashi et al. | |
| 7,184,384 B2 * | 2/2007 | Ueyama et al. | 369/112.05 |
| 7,215,609 B2 * | 5/2007 | Shimano et al. | 369/44.37 |
| 7,218,599 B2 * | 5/2007 | Watanabe et al. | 369/112.07 |
| 7,327,661 B2 * | 2/2008 | Ohnishi et al. | 369/112.03 |
| 2003/0053397 A1 * | 3/2003 | Katayama et al. | 369/112.17 |
| 2004/0081064 A1 | 4/2004 | Ohnishi et al. | |
| 2004/0090900 A1 * | 5/2004 | Yoo et al. | 369/112.08 |
| 2004/0252620 A1 | 12/2004 | Watanabe et al. | |

FOREIGN PATENT DOCUMENTS

| | | |
|---|---|---|
| JP | 05-047030 | 2/1993 |
| JP | 08-338904 | 12/1996 |
| JP | 1020010082074 | 8/2001 |
| JP | 2004-063073 | 2/2004 |
| JP | 2004-145915 | 5/2004 |
| JP | 2004-334962 | 11/2004 |
| KR | 10200110002873 | 1/2001 |

* cited by examiner

*Primary Examiner*—Wayne R Young
*Assistant Examiner*—Lixi Chow
(74) *Attorney, Agent, or Firm*—Roylance, Abrams, Berdo & Goodman, L.L.P.

(57) ABSTRACT

A diffraction element for an optical pick-up apparatus is capable of precisely controlling the tracking of the pick-up apparatus. The diffraction element includes a diffraction grating divided into a first, a second, and a third region. The second region is located between the first and third regions. Any one of the first region and the third region is inclined at a predetermined angle θ with respect to the second region.

17 Claims, 10 Drawing Sheets

DIFFRACTION ELEMENT AND OPTICAL PICK-UP APPARATUS HAVING THE SAME

CROSS-REFERENCE TO RELATED APPLICATIONS

This application claims the benefit under 35 U.S.C. §119 (a) of Korean Patent Application No. 2005-5108, filed on Jan. 19, 2005, in the Korean Intellectual Property Office, the entire content of which is hereby incorporated by reference.

BACKGROUND OF THE INVENTION

1. Field of the Invention

The present invention relates to an optical pick-up apparatus. More particularly, the present invention relates to a diffraction element that improves tracking control, and an optical pick-up apparatus that uses the diffraction element.

2. Description of the Related Art

An optical pick-up apparatus is used in various devices such as compact disk players (CDs), digital versatile disk players (DVDs), CD-ROM drives, and similar device to read and write information from an optical recording medium (such as an optical disk) without contacting the medium. To write information, the optical pick-up irradiates the laser beam on the surface of the optical medium to form pits. To reproduce information, the optical pick-up optically reads the pit information on the optical medium and outputs it as electrical signals. To do this, the optical pick-up includes optical elements such as a laser diode which acts as a light source and generates a laser beam, a diffraction element, a beam splitter for controlling deviation of the laser beam, a plurality of lenses to form an optical path, a light detector for detecting a signal, and the like.

An optical pick-up apparatus focuses the beam spot on the disk surface by vertically controlling an objective lens, and controls the tracking of the beam on a track by horizontally controlling the objective lens. To control the focus and tracking, it is necessary to generate a focus error signal (hereinafter, referred to as a "FE signal") and a tracking error signal (hereinafter, referred to as a "TE signal"). An astigmatism method is usually used to generate the FE signal. Various methods such as a push pull (hereinafter, referred to as a "PP") method or a differential push pull (hereinafter, referred to as a "DPP") method are used to generate the TE signal. The PP method is a method for detecting whether or not the beam spot is positioned at the center of a track by using the intensity detected in each region of a light detecting element that is divided into two regions. In the PP method, however, an offset is generated in the TE signal because the object lens is shifted radially during tracking.

To remedy this, the DPP method uses three beams to control tracking. In the DPP method, a main beam is irradiated at the center of the track, and two sub-beams are irradiated at the periphery of the groove at a predetermined distance away from the main beam. One beam is spaced apart in a radial direction and the other beam is spaced apart in a tangential direction of disk. The DPP method utilizes the difference among the 3 beams. Thus, it is possible to compensate for DC offset in the TE signal. When the DPP method is used for disks with different specifications for track pitch, however, the sub-beams cannot always be formed in the same groove as the main beam. That is, the DPP method is basically limited to a single track pitch, and cannot be used to compensate for DC offset of different types of disks.

Even so, in recent years, the DPP method which irradiates 3 beams on one track has been used. Japan Laid-open Patent Publication 2004-63073, which is hereby incorporated by reference in its entirety, discloses one example of such method, which will be described with reference to FIG. 1A and FIG. 1B.

Figure 1A:
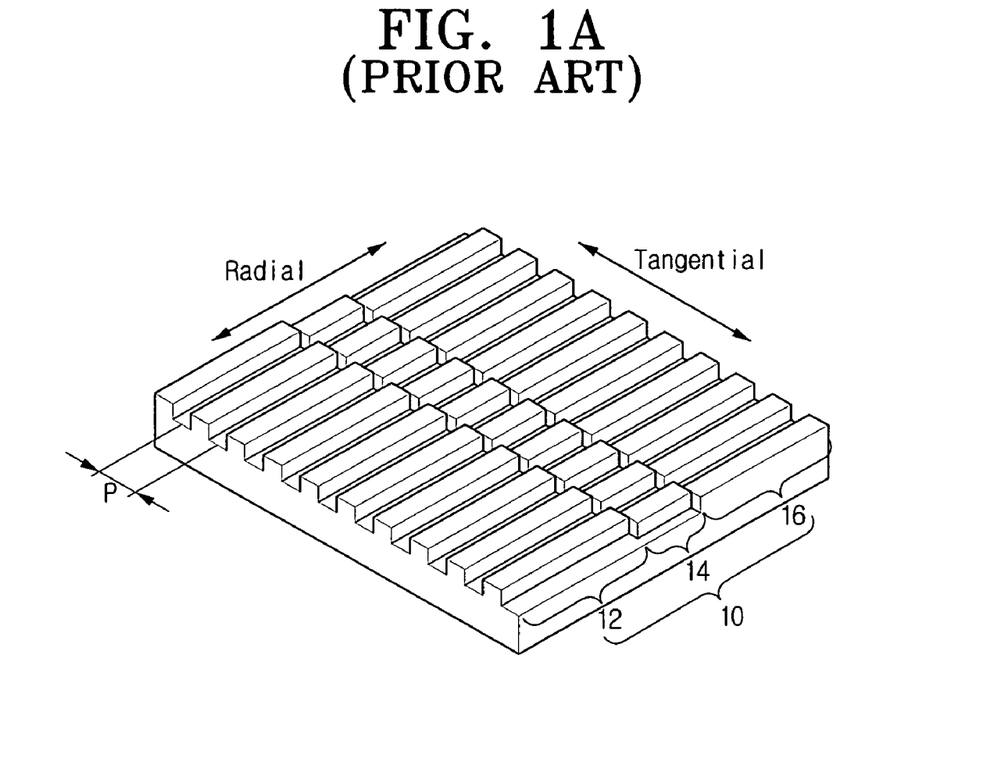
FIG. 1A is a schematic perspective view of a conventional diffraction element.

A diffraction element 10 has three regions 12, 14 and 16, each having diffraction gratings at ¼ pitch (P/4) intervals with each other. Light incident on the diffraction element is diffracted into a main beam MB (the 0th order component) and two sub-beams SB (the ±1st order components). At this time, the main beam does not have any phase difference (0°), while the two sub-beams SB have phase differences of −90° and 90°, respectively. The three beams are aimed at one track T of the disk D, so that the TE signal can be detected from the three beams. However, in such a device, the respective regions 12, 14, and 16 have grooves that are offset with respect to each other, and a phase difference of ±90° occurs between the main beam MB and the sub-beams SB, thereby causing interference between the beams.

Figure 1B:
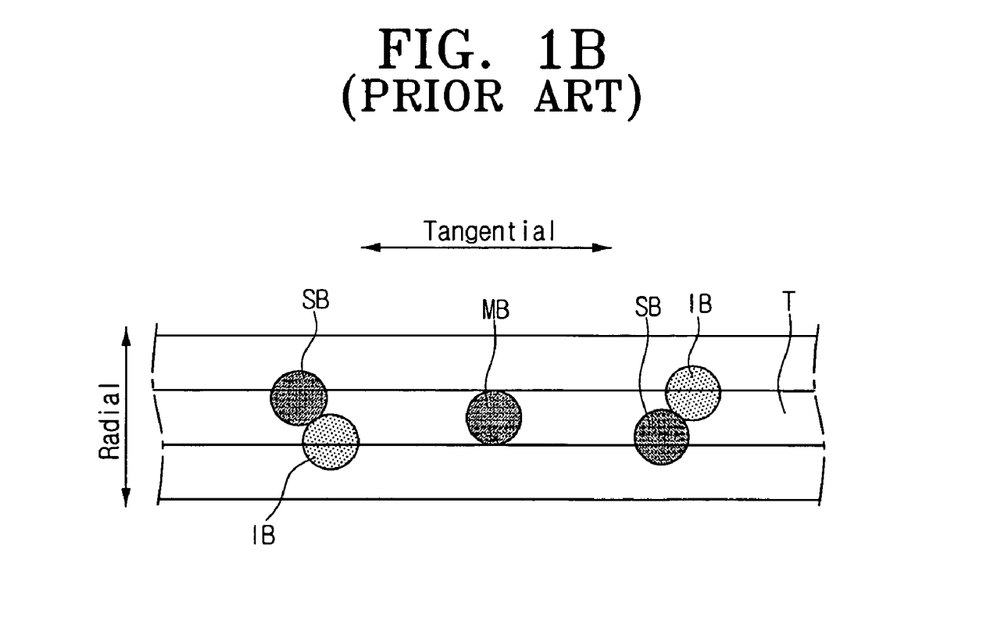
FIG. 1B is a schematic plan view showing light diffracted by the diffraction element shown in FIG. 1 being emitted on a disk.

Due to the interference, the main beam MB forms a spot at the center of a track, but the leading and following sub-beams SB form spots that deviate from the center of track, and an image beam IB is formed at the spot of each sub-beam SB, as seen in FIG. 1B. As a result, the TE signal reflected from the disk D and detected by a light receiving element has errors, which lowers tracking precision.

Accordingly, there is a need for an improved diffraction element for an optical pick-up which improves tracking, and an optical pick-up device using the same.

SUMMARY OF THE INVENTION

An aspect of the present invention is to solve at least the above problems and/or disadvantages and to provide at least the advantages described below. Accordingly, an aspect of the present invention is to provide a diffraction element for an optical pick-up which can perform precise tracking control and an optical pick-up apparatus using the diffraction element.

According to one aspect of the present invention, a diffraction element for an optical pick—includes a first region, a second region and a third region, and each of the regions has a diffraction grating of a predetermined period. The second region is provided between the first region and the third region, and a diffraction grating of at least one of the first region and the third region is inclined at a predetermined angle θ with respect to the diffraction grating of the second region.

According to another aspect of the present invention, an optical pick-up apparatus comprises a light source and a diffraction element to split the beam emitted from the light source into three beams. The diffraction element is divided into a first region, a second region and a third region, and each region has a diffraction grating of a predetermined period. The second region is provided between the first region and the third region. An optical system allows the beam divided by the diffraction element to be emitted onto an optical medium and guides light reflected from the optical medium to an optical detector. The optical detector receives light to detect an information signal, a FE signal, and a TE signal. The diffraction grating of at least one of the first region and the third region is inclined at a predetermined angle θ with respect to the diffraction grating of the second region.

In a first exemplary embodiment of the present invention, the diffraction grating of the first region is inclined at a positive angle +θ1 with respect to the diffraction grating of the second region, the diffraction grating of the third region is inclined at a negative angle −θ3 with respect to the diffraction grating of the second region, the diffraction grating of the first region is offset from the diffraction grating of the second region by ¼ pitch, and the diffraction grating of the second region is offset from the diffraction grating of the third region by ¼ pitch. The width W of the second region is preferably about 0.1 mm, but varies depending on the particular structure of the optical system or the optical components.

In a second exemplary embodiment of the present invention, the diffraction gratings in the first region and the third region may be inclined at positive angles +θ1 and +θ3, respectively, to the diffraction grating of the second region.

According to a third exemplary embodiment of the present invention, the diffraction gratings of the first region and the third region may be inclined at negative angles −θ1 and −θ3, respectively, to the diffraction grating of the second region.

According to a fourth exemplary embodiment of the present invention, the diffraction grating of the first region may be inclined at a negative angle −θ1 to the diffraction grating of the second region, and the diffraction grating of the third region may be inclined at a positive angle +θ3 to the diffraction grating of the second region.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
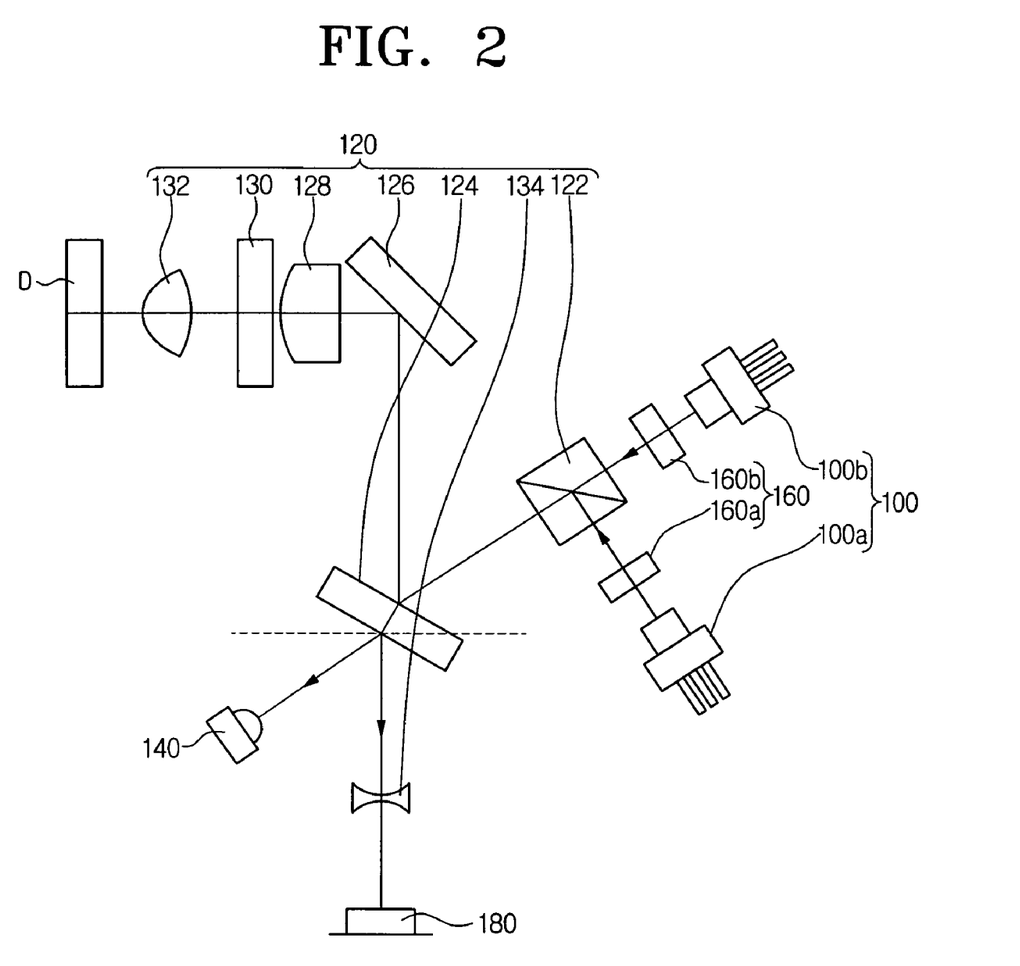
FIG. 2 is a diagram for schematically explaining the principle of an optical pick-up device according to an exemplary embodiment of the present invention.

Referring to FIG. 2, an optical pick-up apparatus according to an exemplary embodiment of the present invention includes a light source 100, an optical system 120, a monitoring light detector (FPD, or front photo diode) 140, a diffraction element 160, and a light detector (PDIC, or photo diode integrated circuit) 180.

The light source 100 includes a first light source 100a for a DVD (Digital Versatile Disk) and a second light source 100b for a CD (Compact Disk). Preferably, the light sources are LDs (laser diodes) that generate a beam having a single wavelength. The first light source 100a writes or reads information from a DVD having a shorter track pitch (TP, see FIG. 6) than a CD, and emits light with a shorter wavelength such as 650 nm. The second light source 100b writes or reads information from a CD and emits light at wavelength such as 780 nm. In the illustrated exemplary embodiment, the light source 100 only includes light sources for DVDs and CDs. The light source may also include light sources for any other desired mediums, such as BD (blue-ray disk) or HD-DVD (high definition DVD), and may emit light having a wavelength of approximately 405 nm.

The optical system 120 includes a first beam splitter 122, a second beam splitter 124, a reflecting mirror 126, a collimating lens 128, a quarter-wave plate 130, an objective lens 132, and a sensor lens 134.

In the exemplary embodiment, a cubic beam splitter is used for the first beam splitter 122. The first beam splitter 122 changes the optical path by reflecting light emitted from the first light source 100a, while passing light emitted from the second light source 100b with substantially no change. Such selective passage of light depends on the wavelength difference between the lights emitted by the first and second light sources 100a and 100b, or polarizing forms of emitted light. Since such technology is generally known to those skilled in the art, a detailed description is omitted for the sake of brevity.

The second beam splitter 124 allows a portion of light emitted from the first beam splitter 122 to be transmitted to the optical detector 140 and the remaining portion to be reflected by the reflecting mirror 126.

The reflecting mirror 126 changes the path of light reflected from the second beam splitter 124 so that reflected light is transmitted to the objective lens 132, and allows light reflected from a disk D acting as the optical medium to be reflected to the second beam splitter.

The collimating lens 128 collimates light reflected from the reflecting mirror 126 into a parallel beam.

The quarter-wave plate 130 changes linearly polarized light that passes the collimating lens 128 into circular polarized light, and changes circular polarized light reflected from the disk into linearly polarized light. Since the function and operation of such a quarter-wave plate 130 is generally known, a detailed explanation is omitted for the sake of brevity.

Light emitted from the quarter-wave plate 130 is focused on the disk D by the objective lens 132.

The sensor lens 134 is preferably a concave lens, in which the spot of light reflected from the disk D is enlarged, thereby making it possible to form larger, more effective spots on the optical detector 180. Also, in order to obtain the FE signal, the sensor lens 134 may generate an astigmatism to detect the FE signal, which will be described later.

Light detector 140 receives a portion of the light emitted from the first and the second light sources 100a and 100b to measure their light intensity. The measured intensity of light is transferred to a control unit (not shown) and controls a voltage applied to the first and the second light sources 100*a* and 100*b*, so that the intensity of light emitted can be constantly controlled.

The diffraction element 160 includes a first diffraction element 160*a* for diffracting beams emitted from the first light source 100*a* and a second diffraction element 160*b* for diffracting beams emitted from the second light source 100*b*. Since the first diffraction element 160*a* and the second diffraction element 160*b* have substantially the same function and shape, only one diffraction element 160 will be described.

Figure 3:
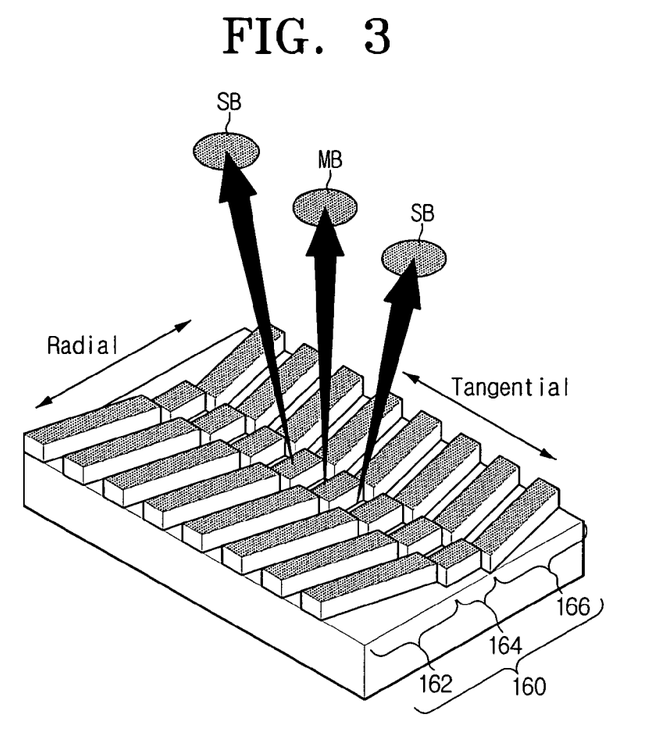
FIG. 3 is a schematic perspective view of a diffraction element according to a first exemplary embodiment of the present invention.
Figure 4:
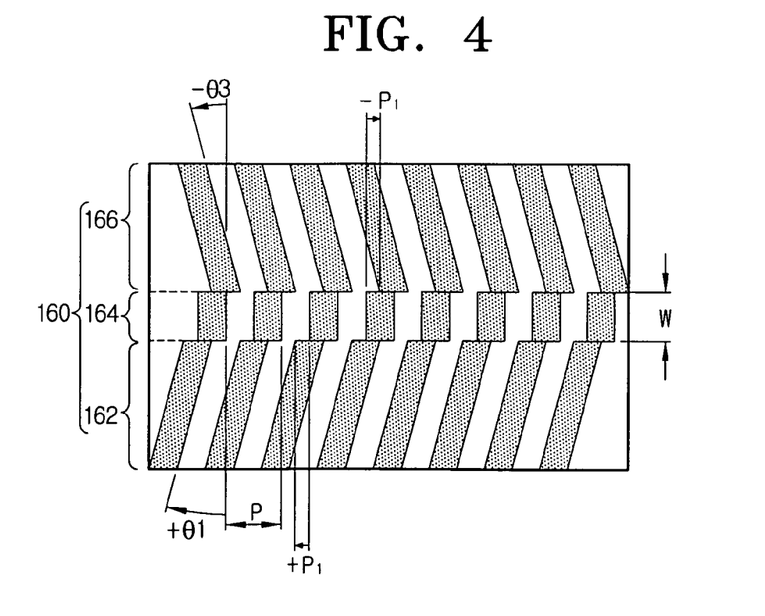
FIG. 4 is a plan view of the diffraction element shown in FIG. 3.

Referring to FIGS. 3 and 4, light emitted from light source 100 is diffracted by the diffraction element 160 to form a main beam MB (the 0th order diffraction beam) and sub-beams SB (the ±1st order diffraction beams).

In particular, light emitted from the light source 100 is divided into 3 beams by the diffraction element 160. The three beams can be used to detect the information signal (for example, RF, or radio signals), the FE signal, and the TE signal, which will be described below, so that the three beams can be focused on one track of the disk D.

To focus the three beams on the center of the track, the following structure is used. The diffraction element 160 is divided into a first region 162, a second region 164 and a third region 166 as shown in FIGS. 3 and 4, in which the second region 164 is located between the first region 162 and the third region 166. Each region is a diffraction grating having a predetermined period. With reference to the diffraction grating of the second region 164, the diffraction grating of the first region 162 is tilted at a positive angle +$\theta 1$, while the diffraction grating of the third region 166 is tilted at a negative angle −$\theta 3$. The "positive" or "negative" angles are determined depending on whether the diffraction grating of the first or the third region 162, 166 is tilted clockwise or counterclockwise from a line extending from the diffraction grating of the second region 164.

Depending on the angles $\theta 1$ and $\theta 3$ of the diffraction gratings of the first and the third regions 162 and 166, the emitting angle of the sub-beams reflected and emitted from the diffraction element changes. Thus, by controlling the angles $\theta 1$ and $\theta 3$ of the diffraction gratings, it is possible to control the position of the sub-beams emitted on the track of the disk D. In other words, based on the angles $\theta 1$ and $\theta 3$ that the diffraction grating of the first and the third regions 162 and 166 form with the diffraction grating of the second region 164, the radial position on the disk D where the spots of the sub-beams SB are emitted can be controlled. Accordingly, the spot of a sub-beam that deviates from the center of the track of the disk D can be shifted to the center of the track by controlling the angles $\theta 1$ and $\theta 3$ of the diffraction grating.

Meanwhile, the diffraction gratings of the first region 162 and the third region 166 are offset from each other by a predetermined pitch ±P1 with reference to the second region 164. Due to the offset, it is possible to change the phase of a sub-beam. Additionally, the amount of offset of the diffraction gratings controls the shape of the sub-beams SB emitted on the disk D, and also controls whether or not an image beam (IB, see FIG. 1), is formed.

In one particular exemplary embodiment of the present invention, an optimum sub-beam spot form and a minimal image beam were obtained through a simulation when the diffraction gratings of the first region 162 and the third region 166 were offset from the diffraction grating of the second region 164 by ±¼ pitch (±P/4). That is, when the diffraction grating of the first region 162 is offset from the diffraction grating of the second region 164 by +¼ pitch, and when the diffraction grating of the third region 166 is offset from the diffraction grating of the second region 164 by −¼ pitch, the shape of sub-beam SB can be optimized. In other words, the diffraction grating of the first region 162 is offset by a positive 90°, and the diffraction grating of the third region 166 is offset by a negative 90° with respect to the diffraction grating of the second region 164.

The width W of the second region 164 also controls the form of the spot focused on the disk. Thus, by appropriately controlling the width W of the second region 164, the spot on the disk can be optimized. In one exemplary embodiment of the present invention, a simulation determined that when the width W of the second region was 0.1 mm, an optimized spot was formed. In the simulation, the focal distance of the collimating lens was 20 mm, and the focal distance of the objective lens was 3.05 mm. This width, however, may change depending on the structure of the optical system.

Figure 5:
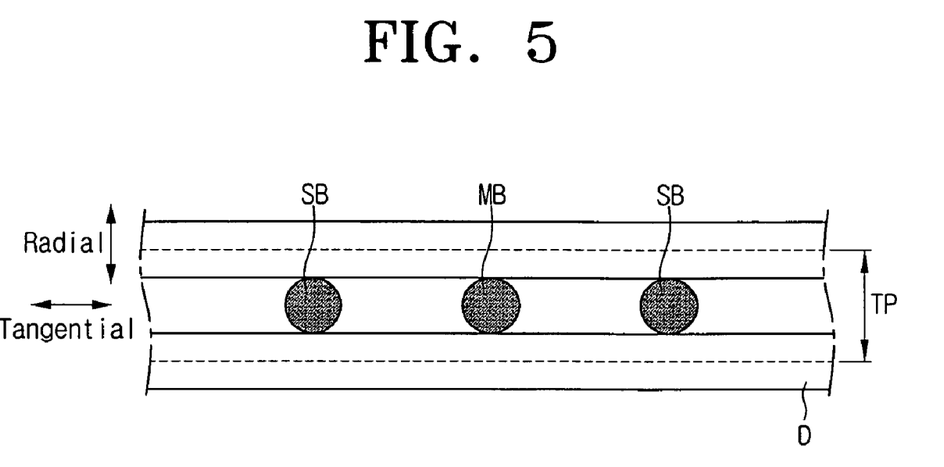
FIG. 5 is a schematic plan view showing three beams divided by a diffraction element hitting the disk.

FIG. 5 shows the shape of a spot formed on a disk when the diffraction gratings of the first and the third regions 162 and 166 are offset by ±¼ pitch with reference to the diffraction grating of the second region 164, and inclined at angles $\theta 1$, $\theta 3$ with reference to the diffraction grating of the second region 164, respectively, with the width W of the second region being set to 0.1 mm. As shown in FIG. 5, both the main beam MB and the sub-beams SB are emitted to the approximate center of the track. Thus, an accurate TE signal can be obtained by such an adjustment, thereby enabling more accurate tracking control.

Figure 6:
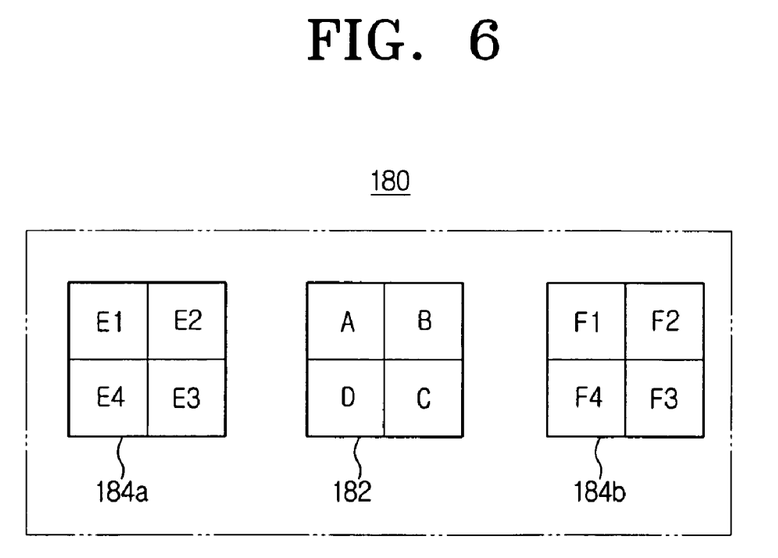
FIG. 6 is a schematic plan view of light detecting elements of FIG. 2.

Referring to FIG. 6, light detector 180 converts light reflected from the disk D into an electrical signal, and detects an information signal, FE signal, and TE signal. Light detector 180 includes three light detecting elements 182, 184*a* and 184*b*. The main beam MB (FIG. 5) reflected from the disk D is emitted at the three light detecting elements 182, 184*a* and 184*b* of light detector 180, respectively, by way of an objective lens 132, a quarter-wave plate 130, a collimating lens 128, a second beam splitter 124, and a sensor lens 134 (see FIG. 2). Light detecting element 180 provided at a central portion functions as a light detecting element for the main beam and is divided into four regions A, B, C and D. Light detecting elements 184*a* and 184*b* provided at both sides of light detecting element 182 function as light detecting elements for sub-beams and are divided into regions E1, E2, E3, E4, and regions F1, F2, F3, F4, respectively. The main beam MB (see FIG. 5) and sub-beams SB (see FIG. 5) irradiate the regions, and electrical signals from the irradiated light are output independently from each region.

The FE signal can be obtained by the astigmatism method, and the TE signal can be obtained by the DPP method. Assuming that the electrical signals output from the divided regions are a, b, c and d; e1, e2, e3 and e4; and f1, f2, f3 and f4, respectively, the information signal (RF) is calculated by Equation 1, FE signal by Equation 2, and TE signal by Equation 3, respectively:

$$RF = a+b+c+d \quad \text{(Equation 1)}$$

$$FE = [(a+c)-(b+d)] + k[(e1+e3)-(e2+e4)+(f1+f3)-(f2+f4)]$$

$$k = (a+b+c+d)/(e1+e2+e3+e4+f1+f2+f3+f4) \quad \text{(Equation 2)}$$

$$MPP = (a+d)-(b+c)$$

$$SPP1 = (e1+e4)-(e2+e3)$$

$$SPP2 = (f1+f4)-(f2+f3)$$

$$SPP = SPP1 + SPP2$$

$$TE(DPP)=MPP-kSPP, k=(a+b+c+d)/(e1+e2+e3+e4+f1+f2+f3+f4)$$ (Equation 3)

The light intensity of a sub-beam diffracted as a ±1st order beam is lower than that of a main beam diffracted as a 0 order beam, thus k is a gain for compensating for the different intensities.

Figure 7A:
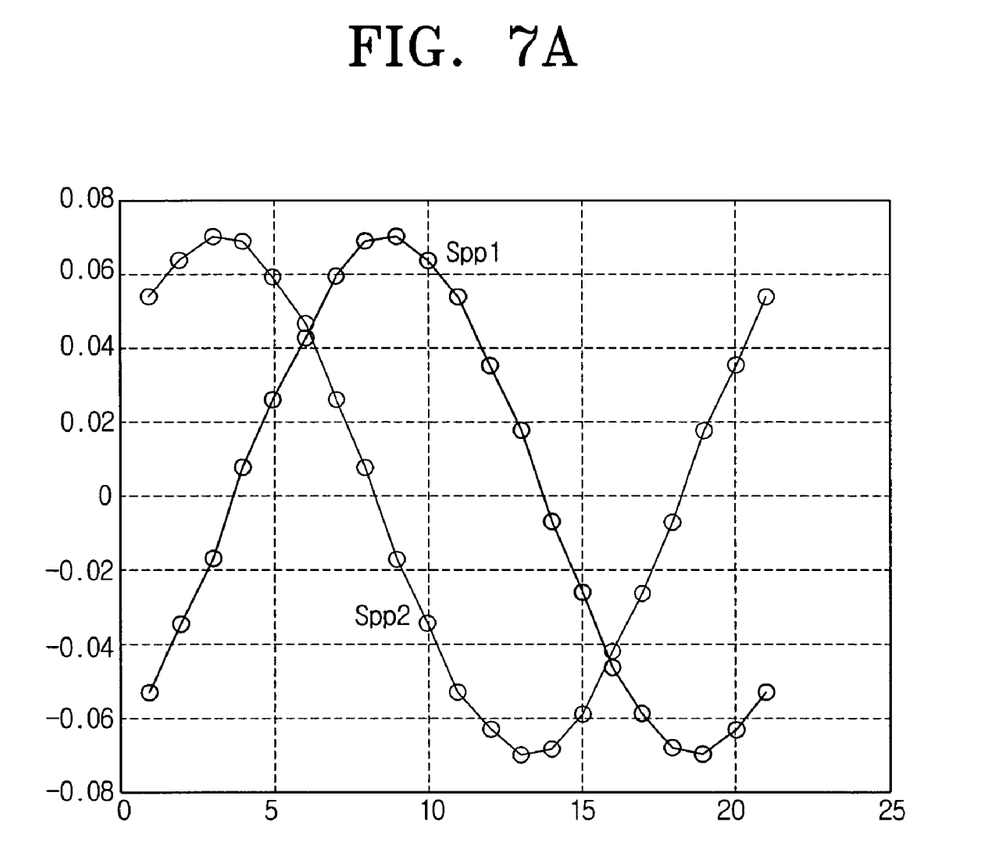
FIGS. 7A to 7D are graphs that schematically illustrate a detection process of the Tracking Error (TE) signal according to the first exemplary embodiment of the present invention.
Figure 7B:
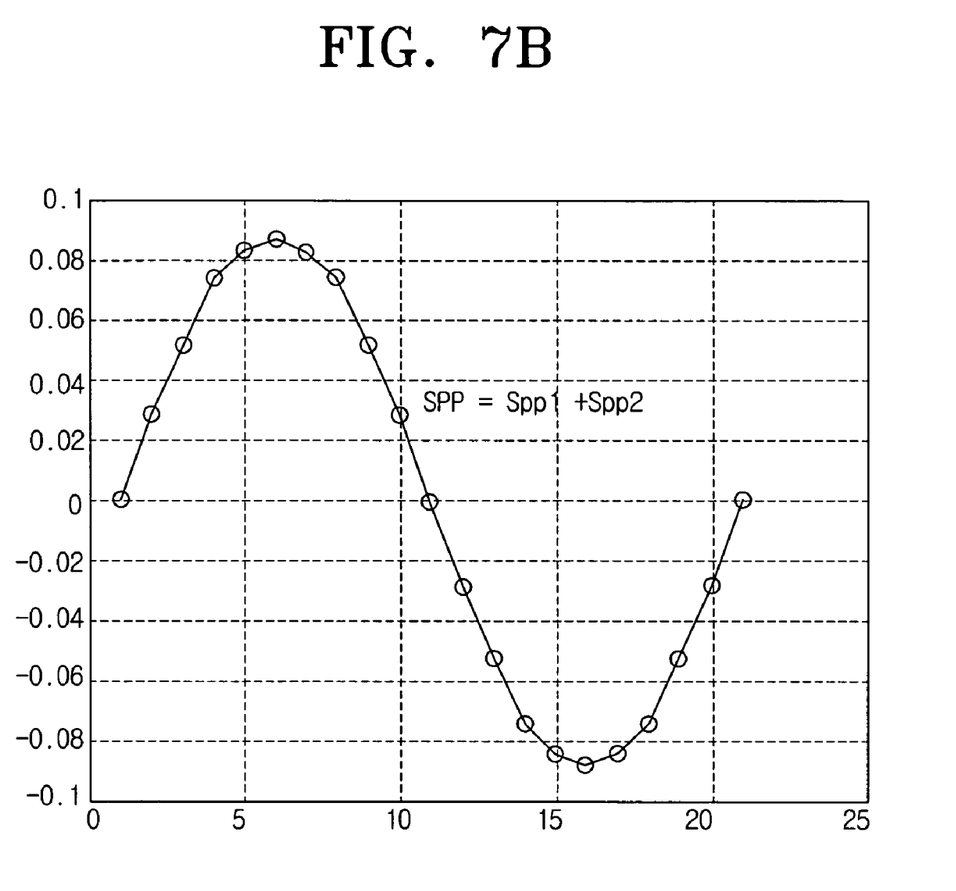
Figure 7C:
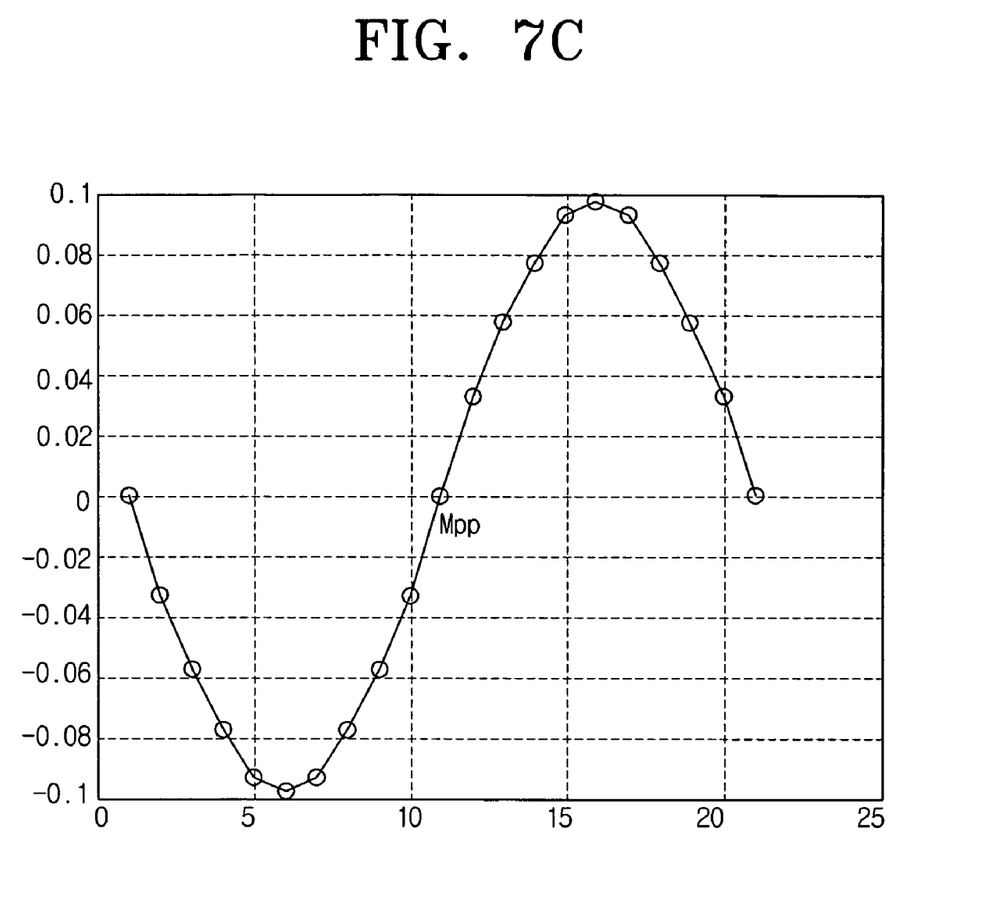
Figure 7D:
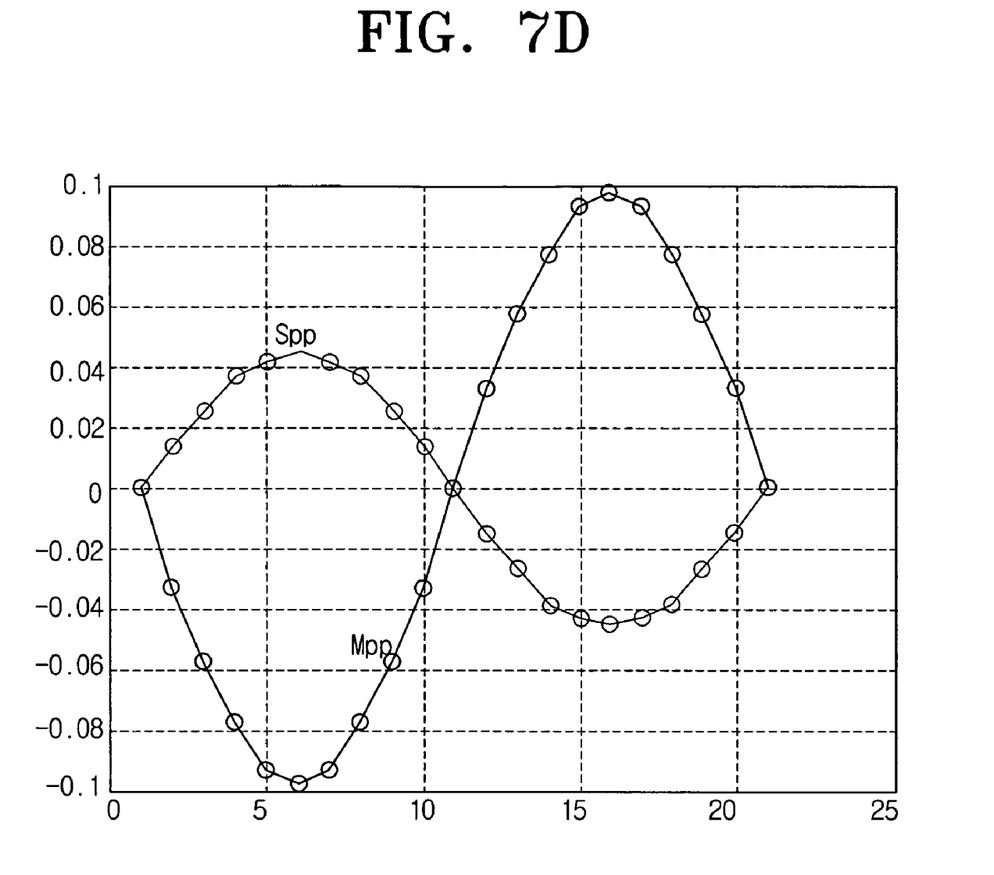

Signal waveforms of SPP1, SPP2, SPP, MPP (main beam push pull) which are generated by Equation 3 are shown in FIGS. 7A to 7D. As shown in FIG. 7D, the SPP signal has a phase difference of 180 degrees with respect to the MPP signal, thereby enabling the operation of TE signal. Thus, in the present invention, the SPP signal and the MPP signal have a phase difference of 180 degrees with each other, so that tracking control thereof can be performed by the DPP method. Also, the sub-beams SB which deviate from the track center are able to move toward the track center in such a manner that they are tilted by a predetermined angle with respect to the diffraction grating, so that light can be emitted on light detecting elements 184a and 184b with a precise light intensity and positioning, which generates an accurate TE signal. Thus, by generating such an accurate TE signal, it is possible to perform precise tracking control.

Figure 8:
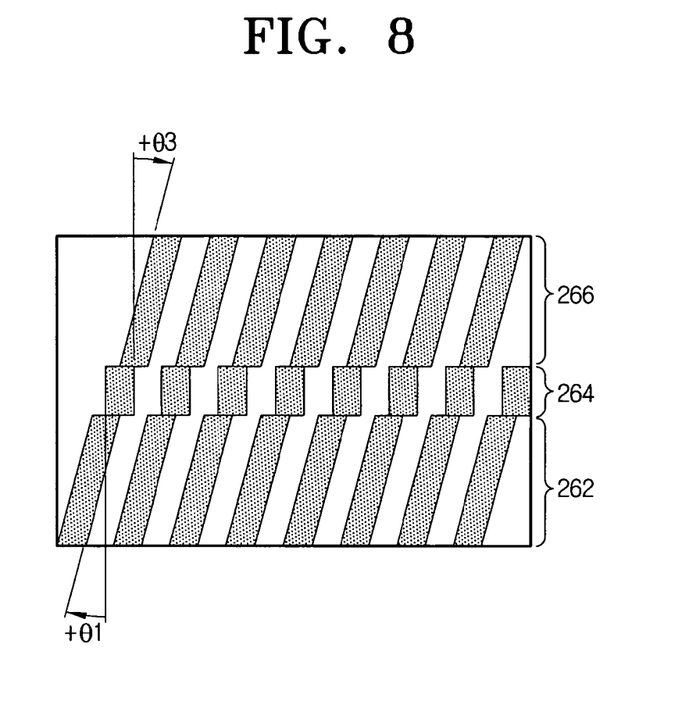
FIG. 8 is a plan view of a diffraction element according to a second exemplary embodiment of the present invention.

Referring to FIG. 8, in the second exemplary embodiment of the present invention, the diffraction gratings of the first region 262 and the third region 266 are inclined at positive angles +θ1 and +θ3, respectively, with reference to the diffraction grating of the second region 264.

Figure 9:
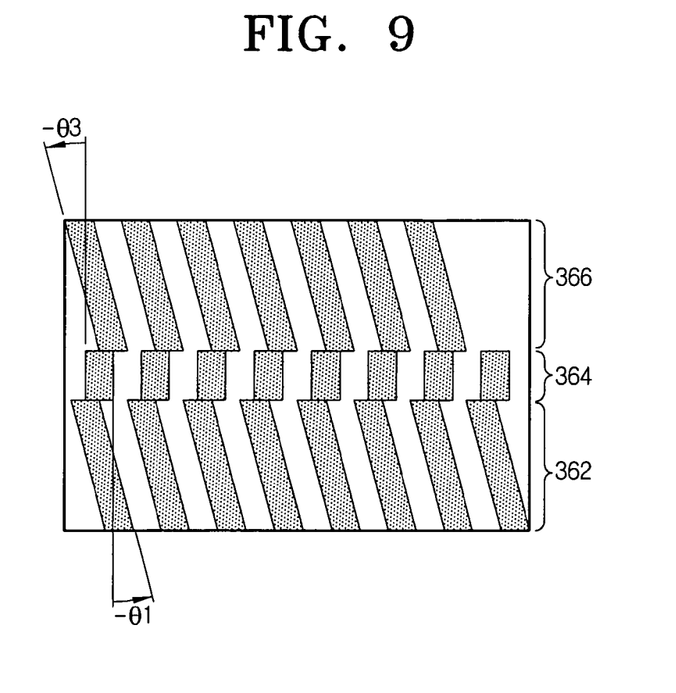
FIG. 9 is a plan view of a diffraction element according to a third exemplary embodiment of the present invention.

Referring to FIG. 9, in the third exemplary embodiment of the present invention, the diffraction gratings of the first region 362 and the third region 366 are inclined at negative angles −θ1 and −θ3, respectively, with reference to the diffraction grating of the second region 364.

Figure 10:
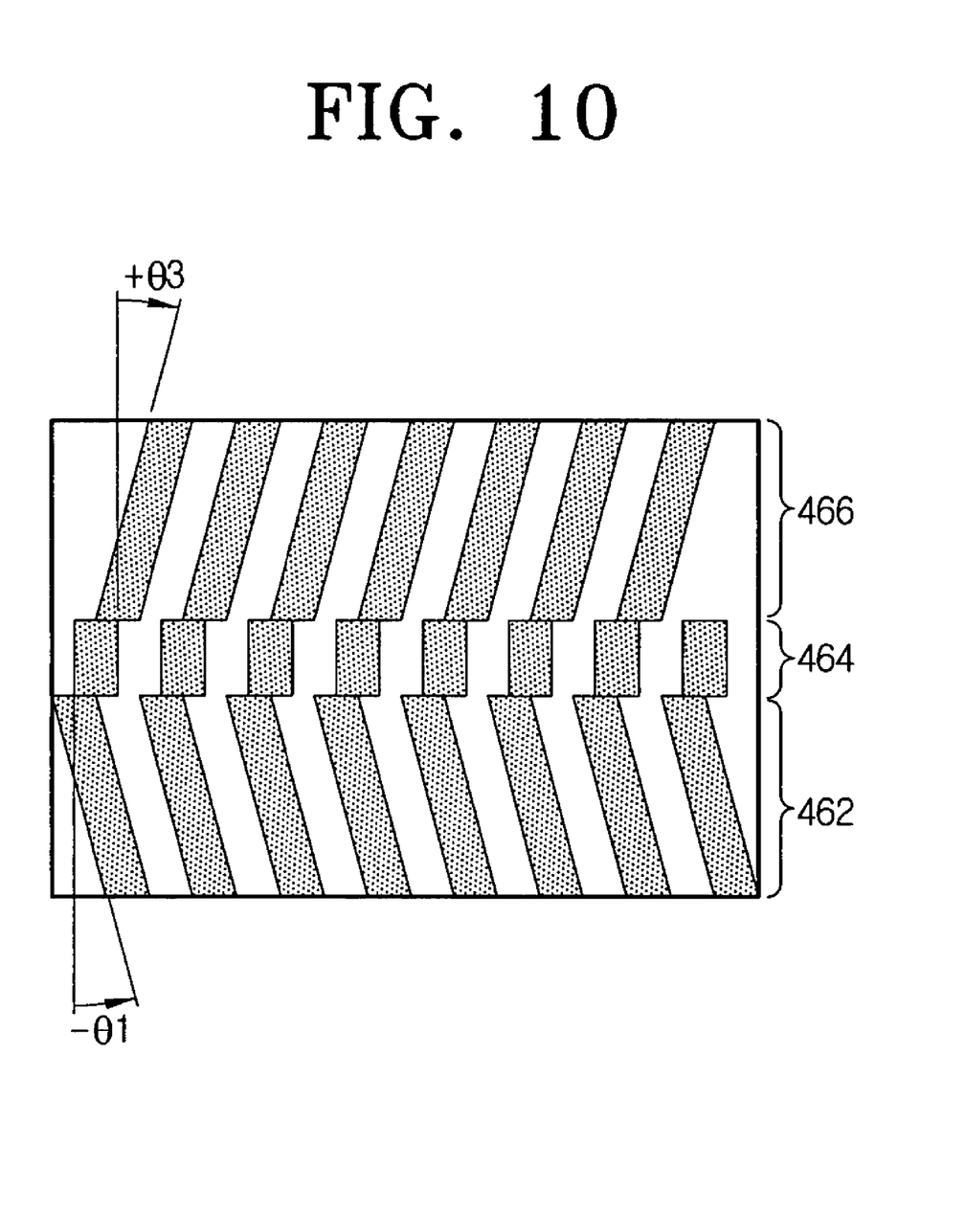
FIG. 10 is a plan view of a diffraction element according to a fourth exemplary embodiment of the present invention.

Then, referring to FIG. 10, in the fourth exemplary embodiment of the present invention, the diffraction grating of the first region 462 is inclined at a negative angle −θ1 with reference to the diffraction grating of the second region 464, while the diffraction grating of the third region 466 is inclined at a positive angle +θ3 with reference to the diffraction grating of the second region 464.

As described above, the angles θ of the diffraction gratings of the first region 162, 262, 362, 462, and the third region 166, 266, 366, 466 can be controlled in view of not only the degree of the angle, but also the direction of inclination, so that the sub-beams SB can be emitted precisely at the track center of the disk D According to the present invention, the diffraction gratings of the first region and the third regions 162 and 166 among three regions of the diffraction element are inclined at predetermined angles, so that the sub-beams SB can be emitted precisely at the track center of disk D, thereby obtaining an accurate TE signal.

Since an accurate TE signal can be generated, it is possible to perform precise tracking control.

While the invention has been shown and described with reference to certain embodiments thereof, it will be understood by those skilled in the art that various changes in form and details may be made therein without departing from the spirit and scope of the invention as defined by the appended claims.

What is claimed is:

1. A diffraction element for an optical pick-up, comprising:
a first region, a second region, and a third region each having a diffraction grating of a predetermined period, the second region being located between the first region and the third region,
wherein at least one of the diffraction gratings of the first region and the third region is inclined at a predetermined angle θ with respect to the diffraction grating of the second region to eliminate formation of an image beam and emit a main beam and sub-beams on a center of a track;
the diffraction grating of the first region is offset from the diffraction grating of the second region by a predetermined positive pitch +P1 and the diffraction grating of the third region is offset from the diffraction grating of the second region by a predetermined negative pitch −P1, to change phases of the sub-beams and to control shapes of the sub-beams and the formation of the image beam; and
a width of the second region is controlled to optimize a spot focused on a disk.

2. The diffraction element according to claim 1, wherein the diffraction grating of the first region is inclined at a positive angle +θ1 with respect to the diffraction grating of the second region, and the diffraction grating of the third region is inclined at a negative angle −θ3 with respect to the diffraction grating of the second region.

3. The diffraction element according to claim 1, wherein the diffraction gratings of the first and third regions are inclined at positive angles +θ1 and +θ3, respectively, with respect to the diffraction grating of the second region.

4. The diffraction element according to claim 1, wherein the diffraction gratings of the first and third regions are inclined at negative angles −θ1 and −θ3, respectively, with respect to the diffraction grating of the second region.

5. The diffraction element according to claim 1, wherein,
the diffraction grating of the first region is inclined at a negative angle −θ1 with respect to the diffraction grating of the second region, and
the diffraction grating of the third region is inclined at a positive angle +θ3 with respect to the diffraction grating of the second region.

6. The diffraction element according to claim 1, wherein the predetermined pitch P1 is ¼ pitch.

7. The diffraction element according to claim 1, wherein the width of the second region is substantially 0.1 mm.

8. An optical pick-up apparatus, comprising:
a light source;
a diffraction element to split the beam emitted from the light source into three beams, the diffraction element being divided into a first region, a second region and a third region each having diffraction gratings of a predetermined period, the second region located between the first region and the third region;
an optical system which allows the beam divided by the diffraction element to be emitted on an optical medium, and guides light reflected from the optical medium; and
an optical detector for receiving light, which is reflected from the optical medium and guided by the optical system, to detect an information signal, a FE signal and a TE signal,
wherein the diffraction grating of at least one of the first region and the third region is inclined at a predetermined angle θ with respect to the diffraction grating of the second region to eliminate formation of an image beam and emit a main beam and sub-beams on a center of a track;
the diffraction grating of the first region is offset from the diffraction grating of the second region by a predetermined positive pitch +P1 and the diffraction grating of the third region is offset from the diffraction grating of the second region by a predetermined negative pitch −P1, to change phases of the sub-beams and to control shapes of the sub-beams and the formation of the image beam; and a width of the second region is controlled to optimize a spot focused on a disk.

9. The optical pick-up apparatus according to claim 8, wherein the diffraction grating of the first region is inclined at a positive angle +θ1 with respect to the diffraction grating of the second region, and the diffraction grating of the third region is inclined at a negative angle −θ3 with respect to the diffraction grating of the second region.

10. The optical pick-up apparatus according to claim 8, wherein the predetermined pitch P1 is ¼ pitch.

11. The optical pick-up apparatus according to claim 8, wherein the width of the second region is substantially 0.1 mm.

12. The optical pick-up apparatus according to claim 8, wherein the light source includes a first light source for a DVD and a second light source for a CD, and the diffraction element includes a first diffraction element and a second diffraction element for diffracting light beams emitted from the first and second light sources, respectively.

13. The optical pick-up apparatus according to claim 8, wherein the optical system comprises:

a first beam splitter for changing an optical path of a light beam emitted from a first light source, and allowing a light beam emitted from a second light source to pass therethrough;

a second beam splitter for changing an optical path of a light beam emitted from a first beam splitter, and guiding a light beam reflected by the optical medium to the optical detector;

a collimating lens for collimating light beam exiting from the second beam splitter into parallel light; and an objective lens for converging light beam from the collimating lens onto a optical medium.

14. A diffraction element for an optical pick-up apparatus, comprising:

a first region having a first diffraction grating with a first predetermined period;

a second region having a second diffraction grating with a second predetermined period; and a third region having a third diffraction grating with a third predetermined period, the second region being located between the first region and the third region, wherein the first diffraction grating is inclined at a predetermined angle θ1 with respect to the second diffraction grating and the third diffraction grating is inclined at a predetermined angle θ3 with respect to the second diffraction grating to eliminate formation of an image beam and emit a main beam and sub-beams on a center of a track;

the first diffraction grating is offset from the second diffraction grating by a predetermined positive pitch +P1 and the third diffraction grating is offset from the second diffraction grating by a predetermined negative pitch −P1, to change phases of the sub-beams and to control shapes of the sub-beams and the formation of the image beam; and a width of the second region is controlled to optimize a spot focused on a disk.

15. The diffraction element according to claim 14, wherein the predetermined angle θ1 is positive with respect to the second diffraction grating, and the predetermined angle θ3 is negative with respect to the second diffraction grating.

16. The diffraction element according to claim 14, wherein the predetermined angle θ1 is positive with respect to the second diffraction grating, and the predetermined angle θ3 is positive with respect to the second diffraction grating.

17. The diffraction element according to claim 14, wherein the predetermined angle θ1 is negative with respect to the second diffraction grating, and the predetermined angle θ3 is negative with respect to the second diffraction grating.

* * * * *

UNITED STATES PATENT AND TRADEMARK OFFICE
CERTIFICATE OF CORRECTION

PATENT NO. : 7,643,395 B2
APPLICATION NO. : 11/254700
DATED : January 5, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Sixteenth Day of November, 2010

David J. Kappos
*Director of the United States Patent and Trademark Office*